United States Patent [19]

Bugatto, Jr.

[11] Patent Number: 4,496,892

[45] Date of Patent: Jan. 29, 1985

[54] STEPPER MOTOR CONTROLLER

[75] Inventor: Henry Bugatto, Jr., San Jose, Calif.

[73] Assignee: Xerox Corporation, Stamford, Conn.

[21] Appl. No.: 586,167

[22] Filed: Mar. 5, 1984

[51] Int. Cl.³ ............................................. H02K 29/04
[52] U.S. Cl. ..................................... 318/696; 318/685
[58] Field of Search ................................ 318/696, 685

[56] References Cited

U.S. PATENT DOCUMENTS

| 4,137,491 | 1/1979 | Bartley et al. | 318/685 |
| 4,328,450 | 5/1982 | Gabor | 318/561 |
| 4,328,452 | 5/1982 | Ragen et al. | 318/685 |
| 4,349,770 | 9/1982 | Ragen et al. | 318/685 |

Primary Examiner—J. V. Truhe
Assistant Examiner—Saul M. Bergmann
Attorney, Agent, or Firm—Robert E. Cunha

[57] ABSTRACT

A stepper motor controller which can control the motor to stop rapidly and with minimum overshoot and oscillation at a selected position by turning on and off one or several coils in a binary fashion to force the motor to conform to a predetermined position/velocity profile, resulting in the motor velocity and the position deviation from the null point to converge to zero at the selected null point. An encoder continuously generates current position and velocity data, a comparator compares the current velocity and position to a predetermined velocity/position profile to produce a binary output, and one or several motor coils are energized to drive the current motor velocity toward the predetermined value.

7 Claims, 6 Drawing Figures

STEPPER MOTOR CONTROLLER

This invention is a means for reducing the time required for a stepper motor to come to a stop and, more specifically, is a circuit for activating the coils to reduce the speed of the motor toward zero as the motor approaches its final position, with a minimum of overshoot and oscillation.

Stepper motors are typically used to control the angular movement of print wheels, carriages, platens, sheet feeding devices and ribbon cartridges in typewriters. In the case of print wheel control, in order to maximize the typing speed and print quality, the print wheel should proceed to its next print position at the highest possible speed, but then stop at the center of that position with a minimum of overshoot and oscillatory motion.

One method of reducing the time required for the print wheel to proceed from one character to the next is to drive the stepper motor with pulses that are variably spaced. That is, the pulses are spaced so that the stepper motor builds up speed smoothly and quickly, turns toward its final position at a high speed, and then slows down as it nears its final position.

A remaining problem is that when digital pulses are used to drive the motor, the last pulse tends to drive the motor past its null position by a fraction of a step, thereby producing several small oscillations before a final stable position is reached.

These oscillations can be prevented by using an analog driver circuit of some kind, such as a servo system, but analog systems tend to increase the equipment cost. It would be desirable to have a digital driver which is controllable to produce motion in the stepper motor which rapidly converges to zero speed at the null position.

This invention describes a digital system wherein motor speed and position information in constantly generated and fed to a processor which controls the stepper motor windings. This information is in the form of a digital signal which indicates whether the motor speed is above or below a predetermined velocity/position profile. In turn, the processor controls the stepper windings to accelerate or decelerate the motor, thus controlling the motor to reduce its speed at an optimal rate so that the speed will go to zero as the motor reaches its null position. In this way, a digital system is able to emulate the operation of a servo system.

This invention will be more clearly understood in relation to the following drawings.

As described above, there tends to be oscillations about the null position after the last pulse. These can last for a hundred milliseconds or more. This is acceptable in a machine that prints slowly, for example, fifteen to twenty-five characters per second, but becomes objectionable as the print speed reaches fifty characters per second or greater. In a typical high speed print wheel, three to four milliseconds would be an appropriate time period for stopping the motor.

To enable the remainder of the circuit to control the stepper windings to stop the motor at the center of the last step position, it is necessary for the position transducer to know with some accuracy the position of the motor. A typical digital transducer would not be useable since the square topped signals would not indicate position within each step.

Figure 1:
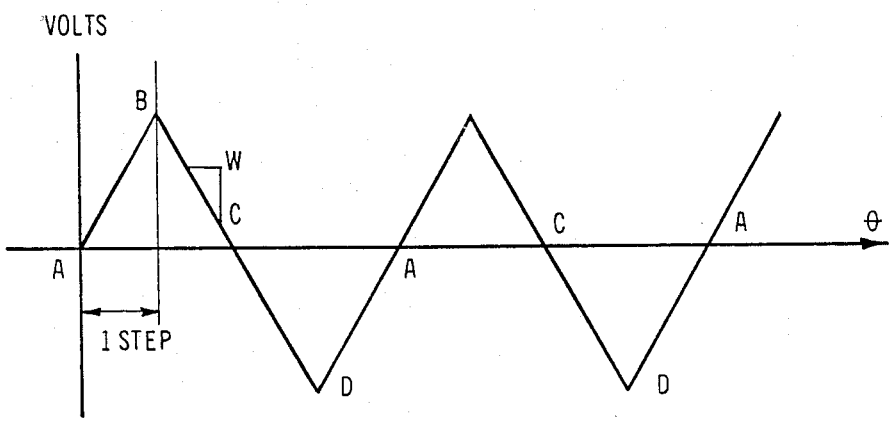
FIG. 1 is a graph of encoder voltage output as a function of angular position.

One possible transducer is a set of two optical gratings, one connected to the print wheel, the other stationary. When the gratings are perfectly aligned, a maximum amount of light is allowed to pass through to a light sensor. As the print wheel moves, the light decreases according to some function defined by the transducer vendor's specifications. A typical sawtooth output waveshape is shown in FIG. 1. The amplitude is a function of the position, and the instantaneous speed can be determined as the derivative of the position. In the described embodiment there are two steps for each print (daisy) wheel spoke (petal), which results in two hundred steps per revolution of the hundred petal print wheel. Thus, the encoder completes one cycle in the shape of a complete sawtooth every four steps.

Ideally, the stepper motor speed should slow smoothly as it approaches the null point, so that the speed goes to zero exactly at the moment when the null point is reached. If the speed is too high, there is the chance of the motor overshooting the null, and one of the motor coils can be energized to slow the motor. Similarly, if the velocity is too low, there will be too much time taken for the motor to reach the null position, and a coil can be energized to speed up the motor. These relationships are graphically described in the graph of FIG. 2.

In this figure, positive position is to the right and positive (c.w.) velocity is up. The null point, O, represents the point where the null position and zero velocity coincide. As the motor is approaching the null point from the left, an optimizing path is shown as line WO. The velocity decreases smoothly, going to zero at point O. If the position/velocity at any point in time is in area 1, the velocity is too low, and a force to the right or clockwise (c.w.) torque should be applied to accelerate the motor. If the point is in area 2, the velocity is too high, and a decelerating coil or coils should be energized.

If the motor overshoots the null point, the position/velocity point will be in area 3. In this case, a coil or coils which will drive the motor back to the left should be energized. When the velocity first goes negative (right to left) the plotted point will be in area 4. An optimizing path now is shown as line YO. A coil which drives the motor to the left (c.c.w.) should be used. If the point enters area 5, the velocity has become too high, and a coil which will slow the motor should be used. Finally, in area 6, the motor is to the left of its intended position and is still moving to the left. A coil which will drive the motor to the right (or c.w.) should be used.

Figure 2:
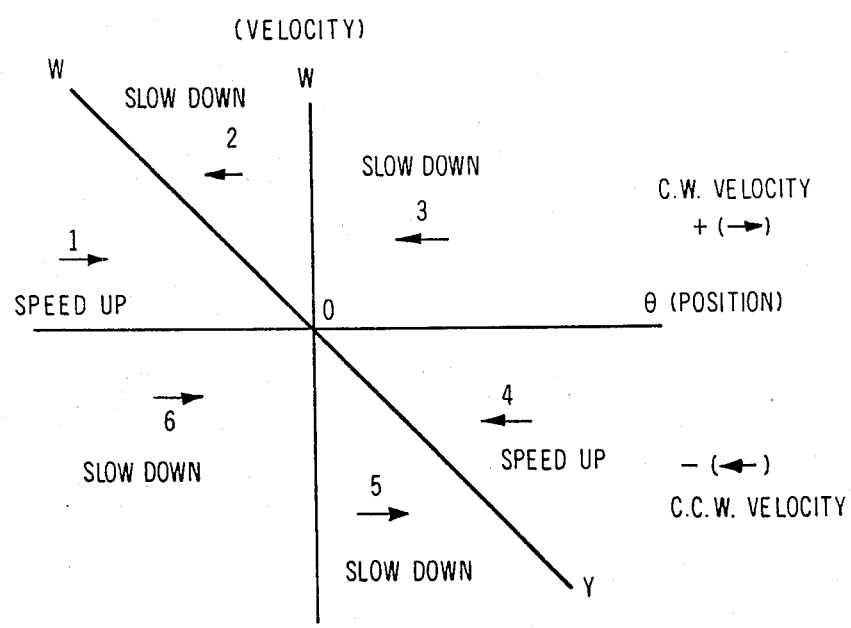
FIG. 2 is a graph of desired angular velocity as a function of angular position.

In areas 2 and 3 of FIG. 2, a force or torque driving the motor to the left (c.c.w.) is required, but the same coils may or may not be used since the relationships of the coils may change as the motor crosses the null point.

Figure 3:
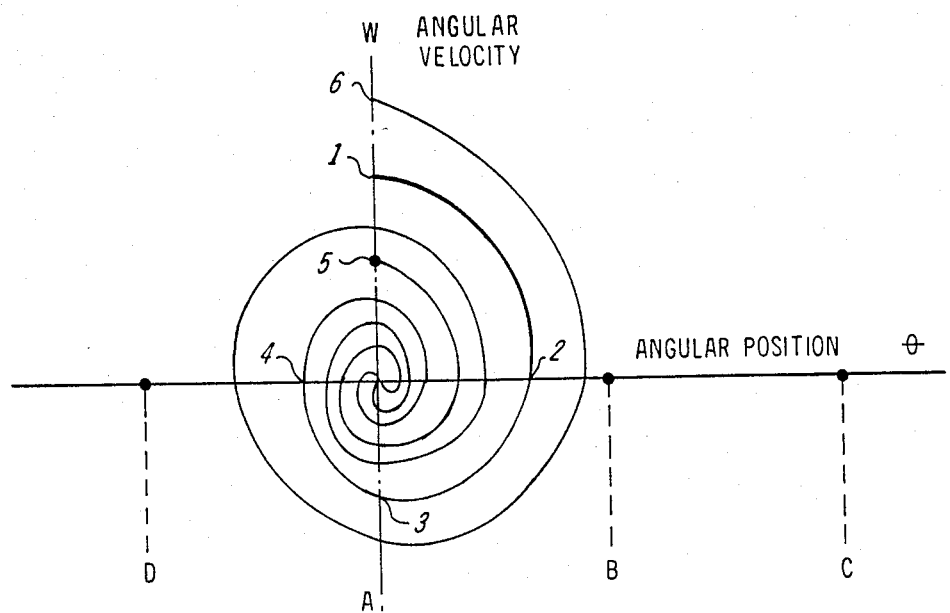
FIG. 3 is a family of curves showing typical oscillations of a stepper motor about its null point where angular velocity is a function of angular position.

The unrestrained motion of the motor is shown in FIG. 3, where the angular position is plotted along the horizontal axis and angular velocity is plotted along the vertical. This stepper motor has four windings, each having a null point, A,B,C and D.

Assume that, with no damping, coil A was energized, resulting in the motor arriving at the null position with a positive velocity. This point can be plotted at point 1. At the null position, there will be no force exerted on the motor by the coil, and the motion toward the right will continue. However, as the movement carries the motor past the null, the energized coil will tend to slow the movement, and finally stop it, as shown, at point 2.

Figure 4:
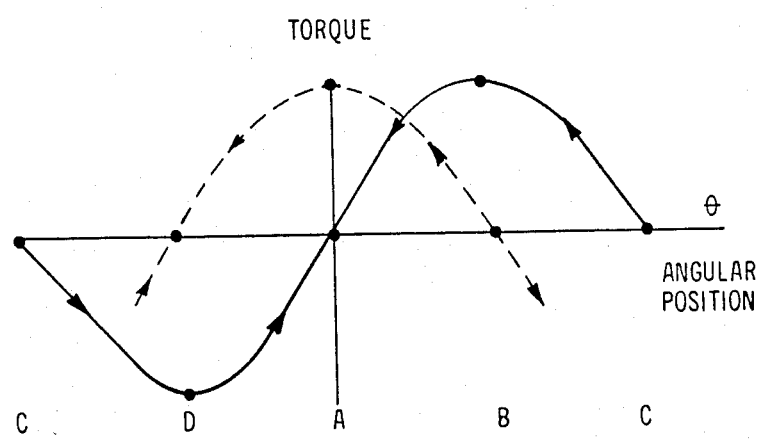
FIG. 4 is a graph of coil torque as a function of angular position.

This motion is the result of the torque generated by the A coil, a graph of which is shown as FIG. 4. The vertical axis is torque, the horizontal is angular position. As shown, to the right of point A, there is a restoring torque to the left, at the left there is a restoring torque to the right, and at the null there is a stable point with no torque being generated.

Continuing with FIG. 3, at point 2, there is no velocity but the position is to the right of the null so the coil will push the motor to the left, eventually arriving at point 3. Inertia will then carry the motor to point 4. Because of friction and other losses, the resultant oscillations result in a spiral eventually stopping at the null point.

The stepper motor could have arrived at the null position starting from a variety of initial velocities or positions, as for instance at points 5 or 6, resulting in the family of curves shown.

It is these oscillations that this invention is intended to prevent, by having the velocity/position plot conform to that of FIG. 2 instead of that of FIG. 3.

Figure 5:
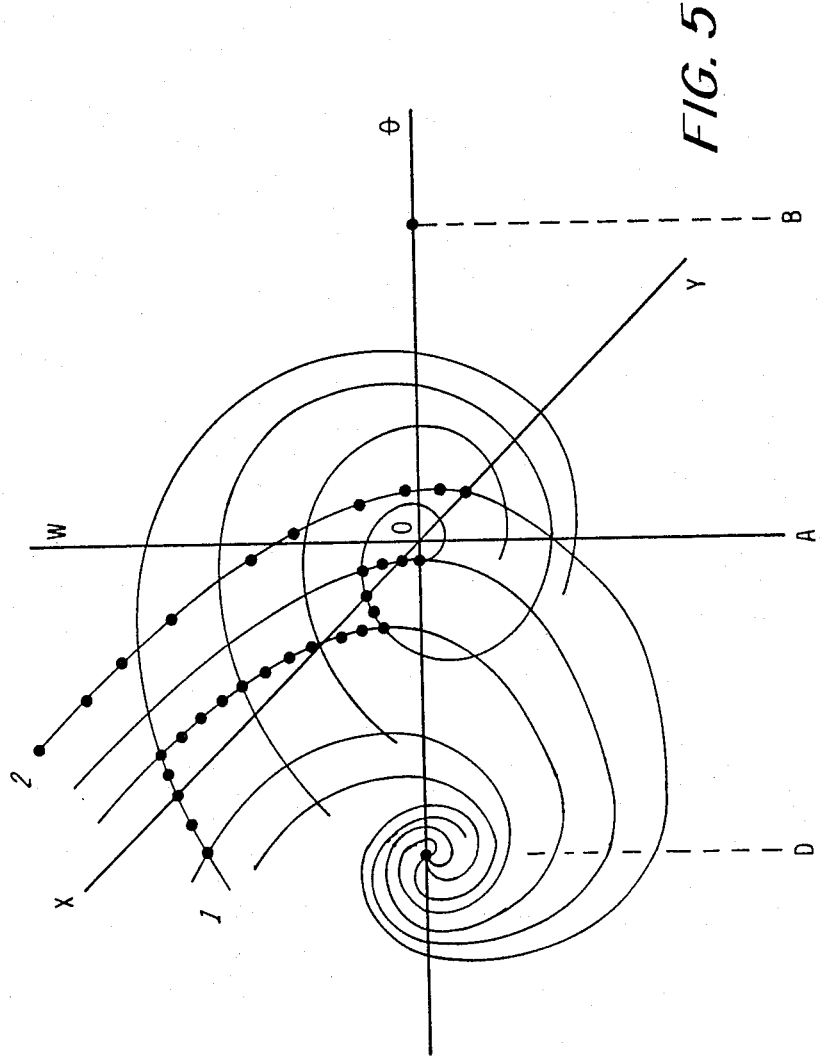
FIG. 5 shows a typical controlled stop where angular velocity is a function of angular position.

This is accomplished as shown in FIG. 5. The horizontal axis is position, and shows the null positions of the D,A and B coils. The vertical axis is angular velocity. The curved lines roughly circling null points D and A are the plots of the natural oscillation paths as would be generated by the associated coils.

Assume that the motor starts at a position/velocity at point 1, that is must stop at the A null point and that it is to be controlled to follow line XO as closely as possible to reach that point. Then, according to FIG. 2, since it starts in the area below line XO, it must be accelerated. This is done by activating coil A, which increases the velocity as shown by the dotted line. Soon, the velocity rises above the XO line, and then coil D is energized, slowing the motor. The result is a motion that approximates line XO by alternately following either the coil D or coil A curves. By successive approximation, the velocity goes to zero as the position approaches the null point.

The other case is where the motor approaches the null position with so much velocity that it can't be stopped before the null point (starting point 2). In this case, coil A will be energized until the curved line intersects line OY in the lower right quadrant. Thereafter, coils A and B will cooperate in a similar fashion to drive the motor along line YO to the null point.

The description to this point assumed that one coil at a time would be activated, but in fact, the operation of the system is improved if two coils at a time are activated when the motor is any significant distance from the null point. For example, as shown in FIG. 4, if the motor position is to the right of the null position A, a much larger force to the left can be generated by using both the A coil (solid line) and the D coil (dashed line). By the same reasoning, if the motor is to the left of the null position A, a larger force to the right can be generated by summing coils A and B (not shown).

There is one further complication. It may be that the motor is more than one step away from its intended null position, which often happens in high speed systems. In terms of FIG. 4, it may be that the motor is between positions B and C, while the desired null position is position A. In this case, coils A and B would be used until the motor was turned past the B point, and then coils A and D would be used, as before to drive the motor toward the A point.

On the other hand, as the motor comes within a small angular deviation of the null point, one coil can be used to soften the drive torque, to discourage mechanical vibrations. Also, at the null point, only one coil is used to lock the motor into a stable stationary position in order to minimize power and improve accuracy.

Figure 6:
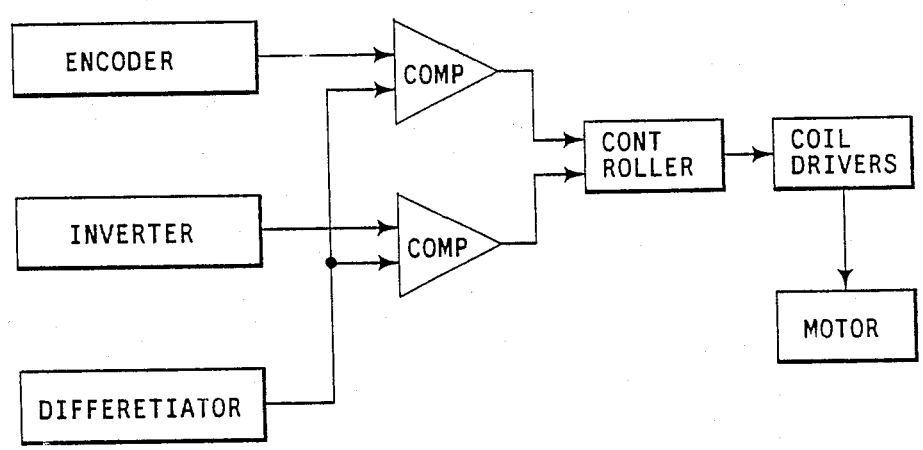
FIG. 6 is a block diagram of the system.

The circuit for controlling the stepper motor drive circuit is shown in block diagram form in FIG. 6. The comparison between the velocity and the predetermined slope of FIG. 2 takes place in one of the comparators of FIG. 6. For each comparator, the velocity input is generated by differentiating the encoder output. The slope is produced by taking the encoder output and multiplying it by a suitable factor. For instance, to generate a threshold slope to be used to stop the motor at position C, the signal generated by the encoder during the period BCD, in FIG. 1, can be used. For a threshold slope to be used at position A, the signal DAB, inverted, can be used. In both cases, a binary comparator output indicating whether the velocity is higher or lower than the slope is generated and sent to the controller, which in turn generates coil drive signals according to the rules discussed in connection with FIGS. 2 and 5.

It can now be seen that this system combines the low cost of a digital system with the accuracy of control of an analog system. Specifically, the various coils of the stepper motor are activated in a binary fashion to control the stepper motor to converge on the null point in such a way that the velocity and position deviation will both smoothly converge at the selected null position. This is made possible by a position encoder which produces information indicating the motor position within each step.

While the invention has been described with reference to specific embodiments, it will be understood by those skilled in the art that various changes will be made and equivalents may be substituted for elements thereof without departing from the true spirit and scope of the invention. In addition, many modifications may be made without departing from the essential teachings of the invention.

I claim:

1. A method of rapidly converging the position deviation and velocity of a stepper motor to zero at a selected null point comprising the steps of:

predetermining a variable velocity threshold in the form of a slope, where the value at any point is a function of the position such that, for any starting point on said slope, the maintenance of the stepper motor velocity along the indicated slope will result in the stepper motor rapidly and smoothly going to zero as the null point is approached, comparing the actual velocity to the predetermined velocity at the current position to produce a binary output indicating whether the current velocity is too high or low, and turning on or off, in response to said binary output, one or more stepper motor coils to drive the actual motor velocity toward the determined value.

2. The method of claim 1 wherein said slope is a straight line so that the velocity is a linear function of position deviation from the null position.

3. The method of claim 1 wherein two coils are turned on at any given instant as the motor approaches the null, and one coil is turned on at the null to maintain the stepper motor position.

4. A circuit for rapidly converging the position deviation and velocity of a stepper motor to zero at a selected null point comprising:
   an encoder for indicating the current position and velocity of said motor,
   means responsive to said current position for determining the velocity the stepper motor should have at that position, said determined velocity being a function of said position,
   a comparator for determining whether the current velocity is higher or lower than the determined value, and
   means responsive to said comparator for energizing one or more stepper motor coils to drive the motor velocity toward the determined value.

5. The circuit of claim 4 wherein said encoder produces a position output which is a linear function of the motor position to produce a triangle waveshape, said waveshape being used either directly or inversely to generate said determined value of velocity.

6. The circuit of claim 4 wherein said means for energizing energizes two coils for greater torque at larger position deviations, and one coil at smaller deviations to minimize transients near the null point and to lock the motor into the null point.

7. In a circuit for damping the velocity of a stepper motor within the last step of the type having a velocity encoder for indicating the current velocity, and means for turning on a coil to slow the motor angular velocity when the actual velocity exceeds a determined value, the improvement comprising:
   a position encoder for indicating the current position, and
   means responsive to said current position for determining the velocity the stepper motor should have at that position, said determined velocity profile being a smooth curve approaching zero as the stepper motor approaches the null position.

* * * * *